3,463,567
PANORAMIC TELESCOPE
Hellmut Böhmer, Hasselborn uber Wetzlar, Germany, assignor to Ernst Leitz G.m.b.H., Wetzlar, Germany
Filed Dec. 12, 1966, Ser. No. 601,033
Claims priority, application Germany, Dec. 23, 1965, L 52,465
Int. Cl. G02b 23/02
U.S. Cl. 350—26                         4 Claims

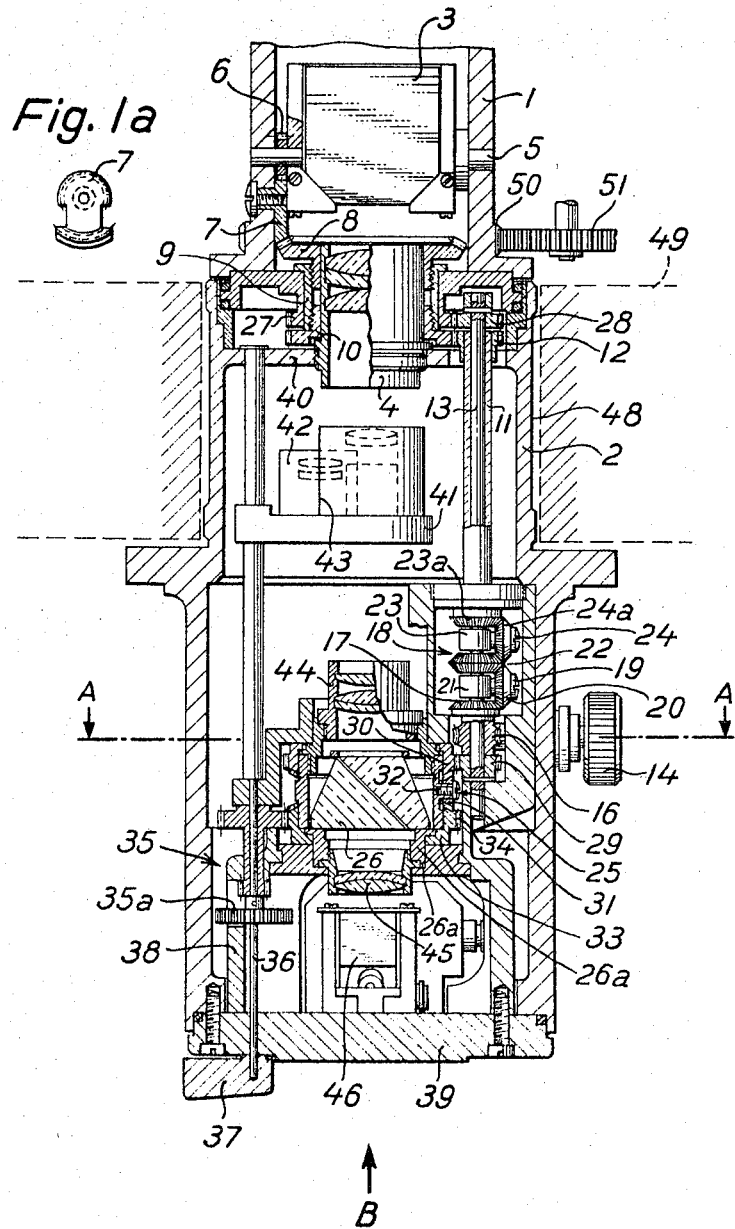

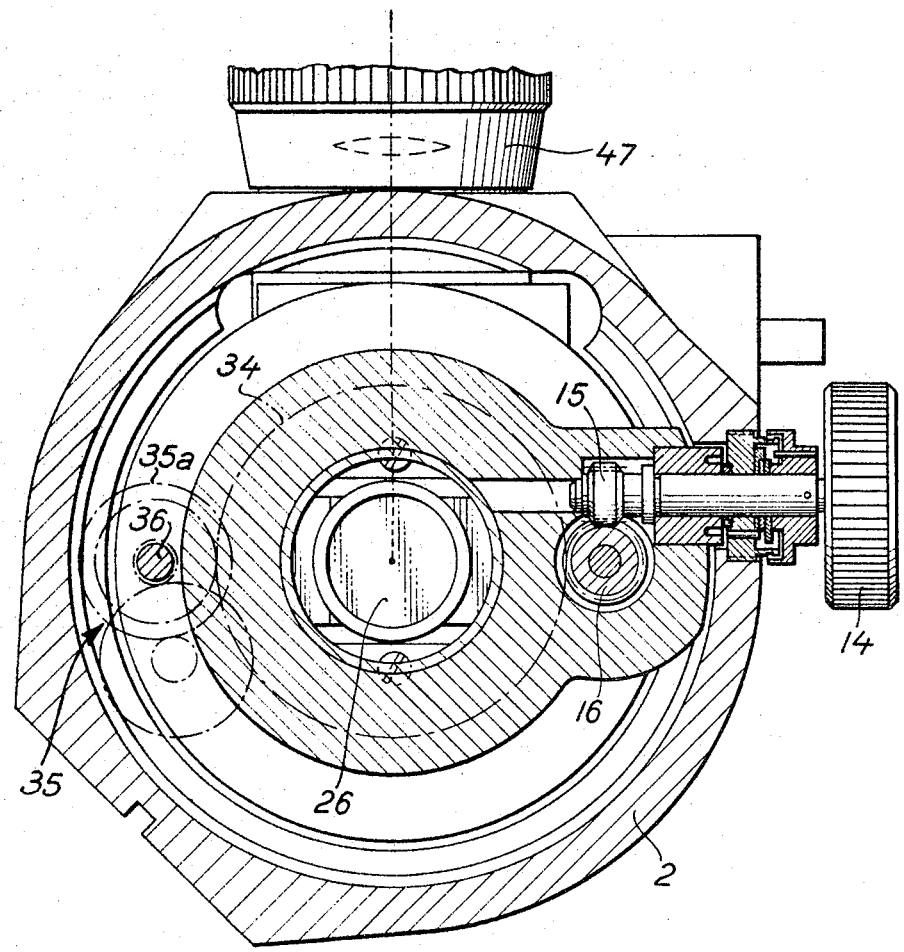

ABSTRACT OF THE DISCLOSURE

The present invention relates generaly to a panoramic telescope, and particularly to a panoramic telescope having a telescope head which is adjustable in elevation, and a convertible day and night aiming optic for use in an armored vehicle.

Cross-references to related applications

Reference is made to the copending application of Horst Schmidt, entitled "Combined Day and Night Viewing Apparatus," filed in the United States Patent Office on Dec. 12, 1966 and having Ser. No. 600,850, the disclosure of which is incorporated herein.

Background of the invention

British Patent 931,474 of Serge and Marcel Clave, published July 17, 1963, having international classification G02b, d (G21), and U.S. Patent 2,488,239 illustrate the state of prior art panoramic telescopes.

The prior art panoramic telescopes are generally constructed in such a way that the elevation of the telescope head is controlled by a positioning mechanism that is mounted directly on the telescope head and which partakes of the rotation thereof. To adapt the telescope for use in armored vehicles, the prior art has suggested that additional control members be extended through the inside of the telescope for adjusting the elevation from the ocular side. But even with an installation which is controlled from inside the vehicle, the control members are carried around by the rotation of the telescope. Whatever advantage is gained thereby is offset by the disadvantage of greater crowding due to increased size of the telescope. It is also necessary, just as with the devices for controlling the elevation, to permit servicing to be performed directly on the telescope head from different positions, For telescopes which must be rotatable through 360°, it is also advantageous to have means for switching in or transposing optical elements in the radiation path between the reflecting member at the entrance end and the ocular, for example, for adapting the telescope to either day or night vision, but the provision of such means is precluded by the elevation controlling members which must partake of such rotation.

Panoramic telescopes are known in which the movement in azimuth of the telescope head is transmitted in a ratio of 2:1 to the trailing righting prism through gearing that is stationary on the housing and which does not preclude the provision of additional adaptation mechanism for the purposes described. With this embodiment, however, it is not possible to control the elevating mechanism of the telescope head from a stationary control knob because the latter is carried along by the rotation in azimuth of the telescope head, resulting in an unintentional change of elevation.

Description of the invention

It is, therefore, an object of the present invention to provide a panoramic telescope that is adjustable in elevation and azimuth from the ocular end and from inside an armored vehicle.

Another object of the present invention is the prevention of interaction between the elevating mechanism and the means for rotating in azimuth of a panoramic telescope.

Still another object of the present invention is a panoramic telescope provided with means for day and night viewing.

A particular object of the present invention is a panoramic telescope of a compact size mounted in a stationary housing in an armored vehicle, with knobs for adjusting the inclination and changing from day to night viewing journaled in a stationary position in the housing.

Upon further study of the specification and claims other objects and advantages of the present invention will become apparent.

According to the present invention, a panoramic telescope is provided in which the movements in azimuth of the telescope head are transmitted to the righting prism by means of a shaft rotatable in a fixed position on the housing, and in which the control knob for elevating the telescope head, and possibly also the knob for adapting to day or night viewing, are supported in a fixed position on the housing. Differential gearing is provided in order to prevent the gearing for rotating the righting prism and the gearing for elevating the head from reacting upon each other. The differential gearing consists essentially of planetary gearing whose planetary axis is supported by a carrier connected to the shaft that transmits the rotation of the telescope head to the righting prism, and whose sun wheel and outer wheel serve as driving or driven members between the knob for elevating the telescope head and the associated driving means. The sun wheel as well as the outer wheel of the planetary gearing are preferably coaxial with the shaft that transmits the rotary movement of the telescope head. Between the wheel on the driven side of the planetary gearing and the actual driving means for elevating movement, additional actuating members including preferably a second planetary mechanism of the same kind are included to ensure that the translational change between the planet carried and the outer wheel on the driven side of the first-mentioned planetary gearing is compensated, so as to prevent the driving means for the elevating mechanism from being actuated thereby. The driving member of the planetary gearing serves to adjust the elevation and for that purpose is preferably connected by worm gearing with the knob which controls the inclination.

Another feature of this invention is the interposition of a third planetary gearing between the righting prism and the shaft which transmits the movements of the telescope head, these movements being transmitted by the planetary gearing in the 2:1 ratio, to the righting prism. For this purpose the righting prism is attached to the planet-carrier axis of the planetary gearing. The telescope head and the righting prism which is coupled therewith can both be driven directly by the shaft, or from the prism. It is also possible to rotate the telescope head directly if the latter is connected for example with a protective cover or rotatable turret.

The control members for transposing the day and night viewing elements in this invention are mounted in the telescope housing or in the bearing supports of the planetary gearing and righting prism, which supports are rigidly fastened to the housing. If the day and night viewing elements are mounted in a changer, e.g., a revolver, then the axis of rotation of the revolver serves as a transposing member and for this purpose is equipped with a handle. Under some conditions, it is necessary according to the means that are positioned in the path, to give the righting prism another operating position. For this purpose, in another embodiment of this invention, the outer wheel of the planetary gearing which is directed toward the righting prism is journaled so that it is fixed in either of two positions 180° apart. This movement is preferably coordinated with the transposing mechanism for day and night viewing.

Further details of the present invention are disclosed in the following specification with particular reference to the drawings showing one embodiment of this invention and in which:

FIGURE 1 is a longitudinal section through the panoramic telescope that is equipped with means for rotating and elevating;

FIGURE 1a shows the segmented gear which serves as the transfer element of the means for elevating;

FIGURE 2 shows a transverse section on the line 2—2 of FIGURE 1.

Figure 1B:
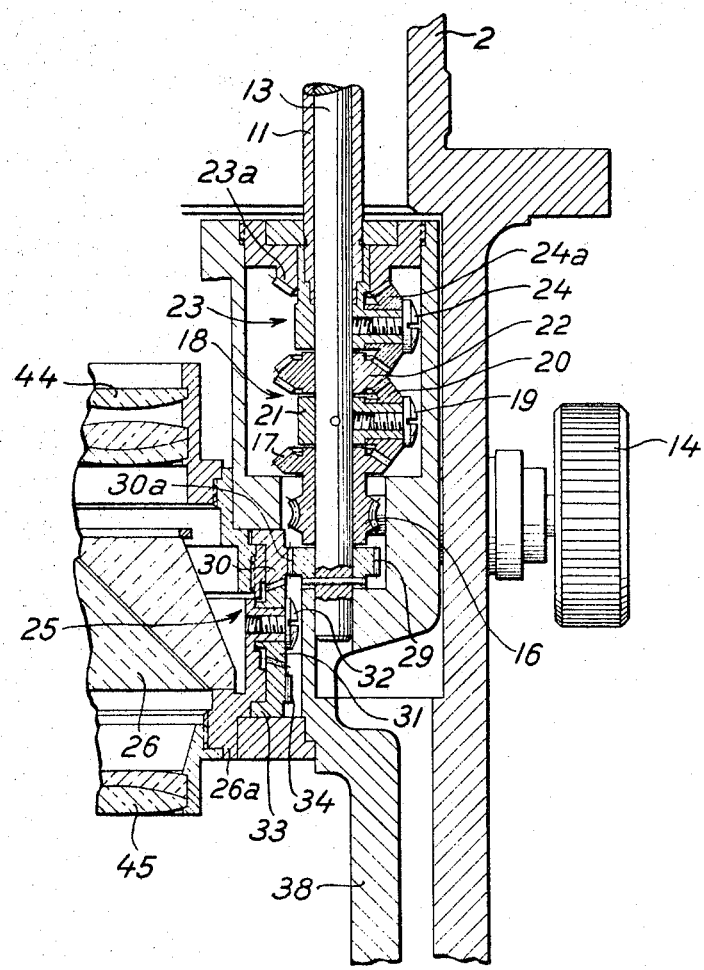
FIGURE 1b shows a portion of FIGURE 1 on a larger scale.

The telescope head 1 is rotatably mounted in the tubular body 2. It contains a scanning prism 3 through which the light rays from the object are directed to the objective member 4 which is firmly mounted in the tubular body 2. To permit adjustment of its elevational angle the scanning prism 3 is rotatable about the axis 5 through an angle of about 90°. The actuating members therefor comprise the spur gear 6, the segmented gear 7 (FIGURE 1a) and the bevel gear 8. The latter is connected by a sleeve 9 with a spur gear 10 which meshes with a pinion 12 on the sleeve 11, the latter being rotatable on a shaft 13 whose functioning will be described below.

The sleeve 11 is actuated by the knob 14 rotatably mounted on the tubular body 2 and carrying a worm 15 (FIGURE 2) for driving the worm gear 16 which is integral with the sun gear 17 on the driving side of planetary gearing 18. The axis 19 of the planet gear 20 of said gearing is part of the planet carrier 21 which is secured to the shaft 13. The other sun gear 22 on the driven side of the planetary gearing is in mesh with a planet gear 24a of a second similar planetary gearing 23 whose planet carrier is secured to the lower end of sleeve 11. The other sun gear 23a of the gearing 23 is stationary with the housing.

A third planetary gearing 25 is associated with the inverting and righting prism 26 in the optic path of the telescope. It serves to transmit in a 2:1 ratio the movements in azimuth of the telescope head 1, the movements being transmitted through the gear 27 that is fastened to the telescope head, the pinion 28, the shaft 13 and the gear 29. For this purpose the sun gear 30 with its teeth 30a, as particularly shown in FIGURE 1b, meshes with the pinion 29 in the same manner as the gear 27 meshes with the pinion 28, while the axis 32 of the planet gear 31 is carried by the mounting 26a, of the righting prism. The outer sun gear 33 is fixable in two positions spaced 180° from each other. For this purpose it is provided with an additional toothed portion 34 meshing with a gear 35, one part 35a being on a shaft 36 which carries at its lower end a double-throw knob 37. The shaft 36 is rotatable in a bearing support 38 which also serves to support the mounting 26a of the righting prism 26 and the previously mentioned planetary gearings 18 and 23. The bearing support 38 is inserted longitudinally into the tubular body 2 and fastened in that position together with the bottom plate 39 by means of screws.

The same axis 36 which is rotatably mounted in the support 38, in the base plate 39 and in the bridge 40, has also fastened to it the turret 41 for changing from day to night viewing or vice versa. The turret carries a tubular mounting 43 for night viewing which can be brought selectively into the ray path behind the objective 4. The tubular mounting 42 or 43 which is swung into operative position is followed on the ocular side by a focusing system comprising the two members 44 and 45 enclosing the righting prism 26, and also by a reflecting prism 46. By the latter the rays are directed to an ocular mounting 47 (FIGURE 2) carried by the side of the tubular body.

The vehicle 49 which carries this telescope has in its armor a hole 48 for receiving the telescope. The telescope head 1 carries peripheral gear teeth 50 meshing with a gear 51 that is driven from a gun tower or turret for rotating the head.

In carrying out the method of operation for viewing in azimuth, rotation is imparted to the telescope head 1 by the gear 51 and is also imparted to gear 27 rotating in unison with the head. The pinion 28 which is in mesh with the gear 27 transmits such rotation to its coaxial shaft 13 which is rotatably mounted in a fixed position in the housing. The pinion 29 which is mounted on shaft 13 transmits the rotation to the sun gear 30 of the planetary gearing 25. The same rotation which is transmitted from gear 27 to pinion 28 is also transmitted from pinion 29 through gear teeth 30a to sun gear 30 which is in mesh with planet gear 31, and since the latter is also in mesh with the outer stationary sun gear 33, the planet carrier 31 which also forms the mounting 26a of the righting prism rotates the latter at half of the angular velocity of the telescope head. This rotation ratio is necessary to compensate for the image inverting effect of the rotation of the telescope head.

By the adjustment in azimuth of the telescope head, the parts 7 to 10 are also actuated. The pinion 12 which is rotated by the gear 10 is mounted on sleeve 11 on which is also mounted the planet carrier 24 of planetary gearing 23 for rotation therewith. Since pinions 12 and 28 are of the same size, the same rotation is also imparted to the planet carrier 21 of planet gear axis 19 of planetary gearing 18. The planet gear 24a travels around the stationary outer sun gear 23a and imparts to the double sun gear 22 twice the angular velocity. During this period, the sun gear 17 of the other planetary gearing 18 is kept stationary. The mechanism for adjusting the elevation therefore remains undisturbed as desired.

The elevation is adjusted by rotating the knob 14 which in turn actuates the worm 15 (FIGURE 2) and rotates the worm gear 16. The telescope head 1 and its shaft 13 for rotating the righting prism are now stationary. The rotation of the worm gear and of the sun gear 17 which is integral therewith transmits by planet gear 20 to the double sun gear 22 in the ratio of 1:1. This in turn drives the planet gear 24a and planet carrier 24 since the outer sun gear 23a is stationary on the housing. The orbital movement of the planet gear 24a causes the sleeve 11 to rotate, this rotation being transmitted by pinion 12 to the gear 10. The bevel gear 8, which is connected by a sleeve 9 with the gear 10, drives the segmental gear 7 which is in mesh with the gear 6 positioned coaxially with the scanning prism 3.

Any concurrent rotation of the telescope head is precluded because at no time during this operation is any motion transmitted to the gearing for rotation in azimuth.

The switching over from day to night viewing is effected by means of the knob 37 whereby the tubular mountings 42 and 43 carried by the turret 41 are moved selectively into the path of the rays between the objective 4 and the intermediate system 44. Simultaneously with the movement of the turret, the righting prism 26 is swung through an angle of 90° by means of the gear connection 34 and 35 and the planetary gearing 25. Since the gear 30 remains stationary during this operation, it does not impart any rotation to the gear 29 and the parts associated therewith for horizontal and elevational adjustment. This switching over serves to compensate for the additional image inversion that is caused by the righting prism. It is omitted when the two systems for day and night viewing are fitted to each other in such a manner that an upright image is always seen in the ocular.

It will be understood that this invention is susceptible to modification in order to adapt it to different usages and conditions and, accordingly, it is desired to comprehend such modifications within this invention as may fall within the scope of the appended claims.

I claim:

1. A panoramic telescope having a scanning head mounted in the upper end of a tubular body (2) for adjustment in elevation and for rotation in azimuth, including a first means (50, 51) for rotation in azimuth, an inverting and righting prism (26) having a second means for rotation in azimuth including a sleeve (11) rotatable in and longitudinally stationary relative to the tubular body, a vertical shaft (13) rotatable in said coaxial sleeve, the upper end of said shaft connected by gearing (27, 28) to the scanning head while its lower end is connected to the inverting and righting prism by first planetary gearing (25) coaxial with the optic axis of the telescope and transmitting the rotation of the scanning head to the inverting and righting prism in a 2-to-1 ratio, second and third planetary gearings connected coaxially in series with each other and mounted coaxially on said shaft, a knob (14) for elevation adjustment connected by worm gearing to a sun gear at one end of said serially connected second and third planetary gearings while a second sun gear at the other end is stationary in the tubular body, two planet carriers of this series being mounted respectively on said shaft (13) and on the lower end of said sleeve.

2. The panoramic telescope of claim 1, further comprising convertible day and night aiming optics, means for transposing from day to night viewing, and a knob (37) connecting said means for transposing mounted on a shaft and journaled in a shaft and journaled in a stationary position in said housing.

3. The panoramic telescope of claim 1, wherein said first planetary gearing (25) has a sun gear (30) in mesh with a spur gear (29) fastened to said shaft (13), and an outer gear (33) adapted to be fixed in either of two positions 180° apart from each other.

4. The panoramic telescope of claim 3, wherein said outer gear (33) is connected with a switching mechanism for day and night viewing whereby during the switching from day to night optics and vice versa said outer gear rotates 180° forward or backward each time.

References Cited

UNITED STATES PATENTS

| | | | |
|---|---|---|---|
| 978,368 | 12/1910 | Grubb | 350—38 X |
| 1,042,346 | 10/1912 | Henle | 350—38 |
| 2,147,615 | 2/1939 | Baroni | 350—23 X |
| 2,152,726 | 4/1939 | Baroni | 350—24 |
| 2,488,239 | 11/1949 | Rattray | 350—24 |
| 2,505,819 | 5/1950 | Wrigley | 350—24 X |
| 2,546,111 | 3/1951 | Rattray | 350—23 X |
| 2,946,255 | 7/1960 | Bolay | 350—18 X |

DAVID SCHONBERG, Primary Examiner

P. R. GILLIAM, Assistant Examiner

U.S. Cl. X.R.

350—8, 38, 44, 53